Dec. 13, 1960     A. W. OLSON ET AL     2,964,105
BURNER APPARATUS
Filed March 2, 1953     5 Sheets-Sheet 1
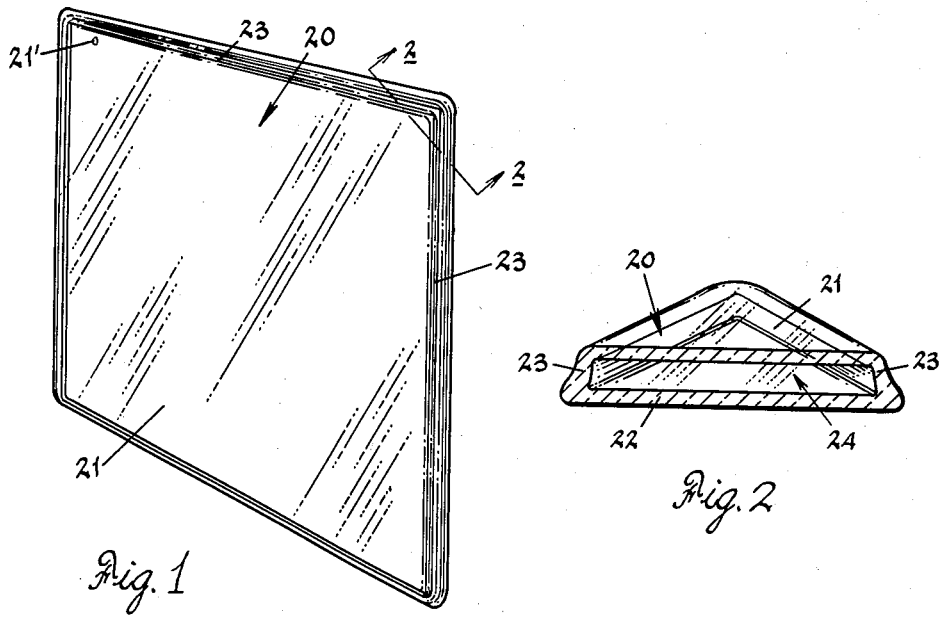
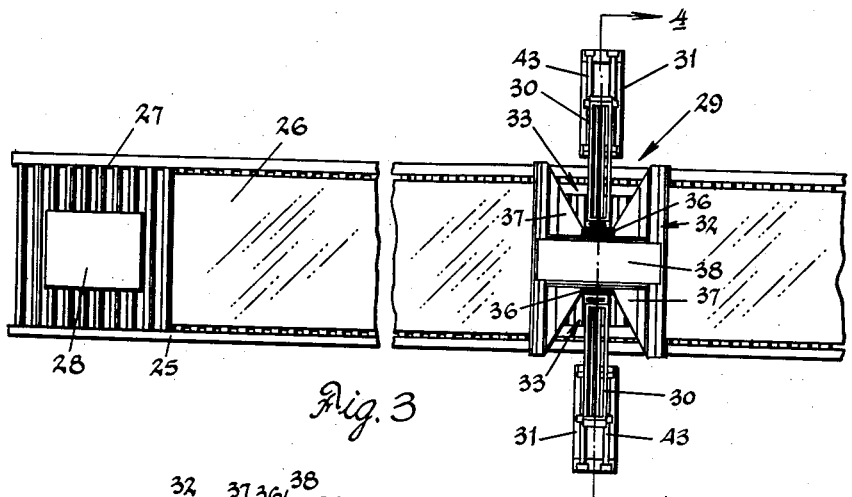
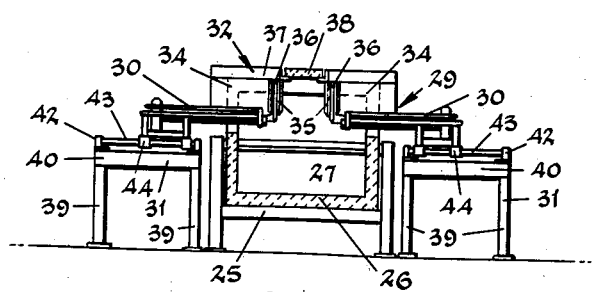
INVENTORS
Albert E. Olson and
BY John A. Woods
Nobbe & Swope
ATTORNEYS

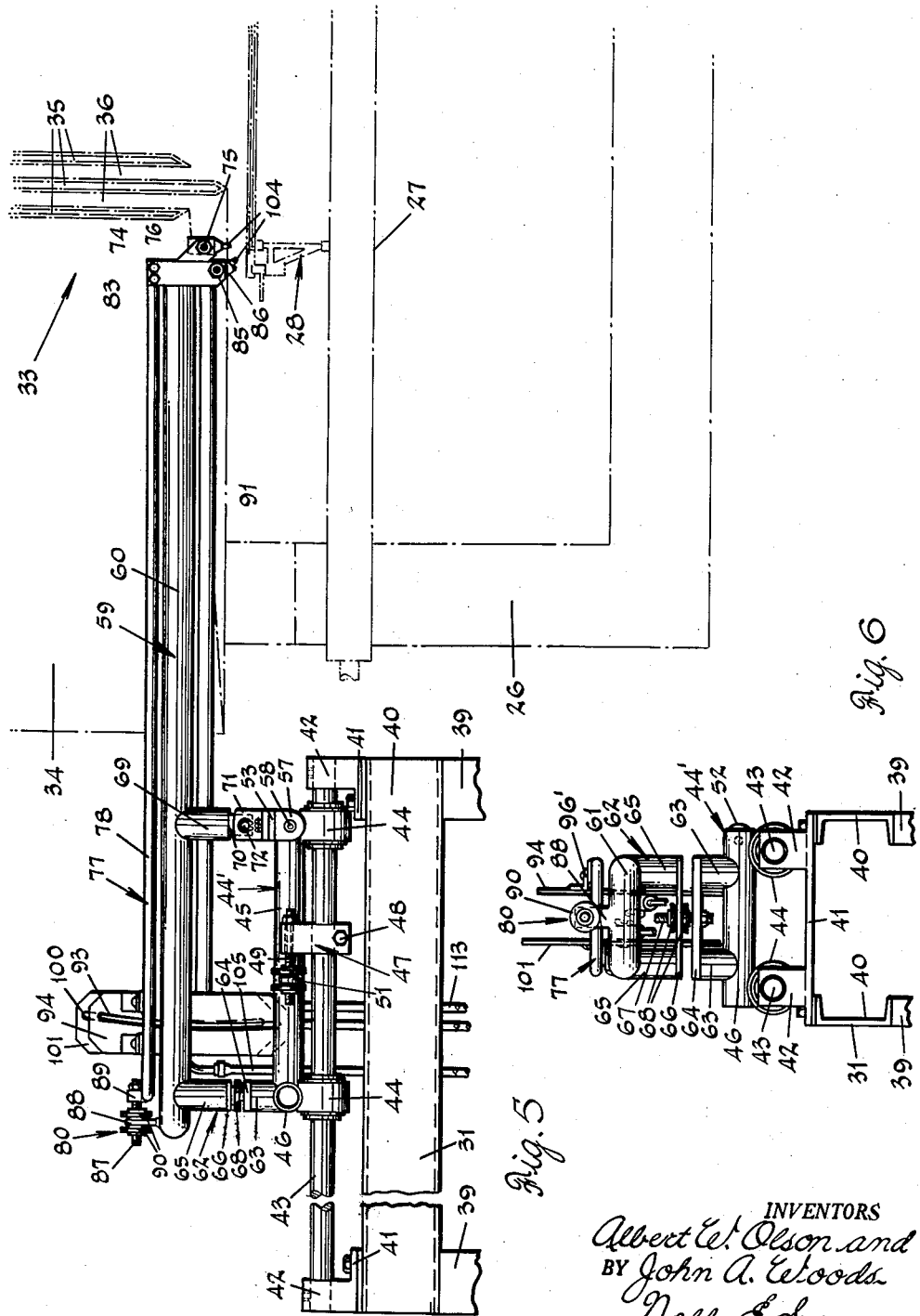

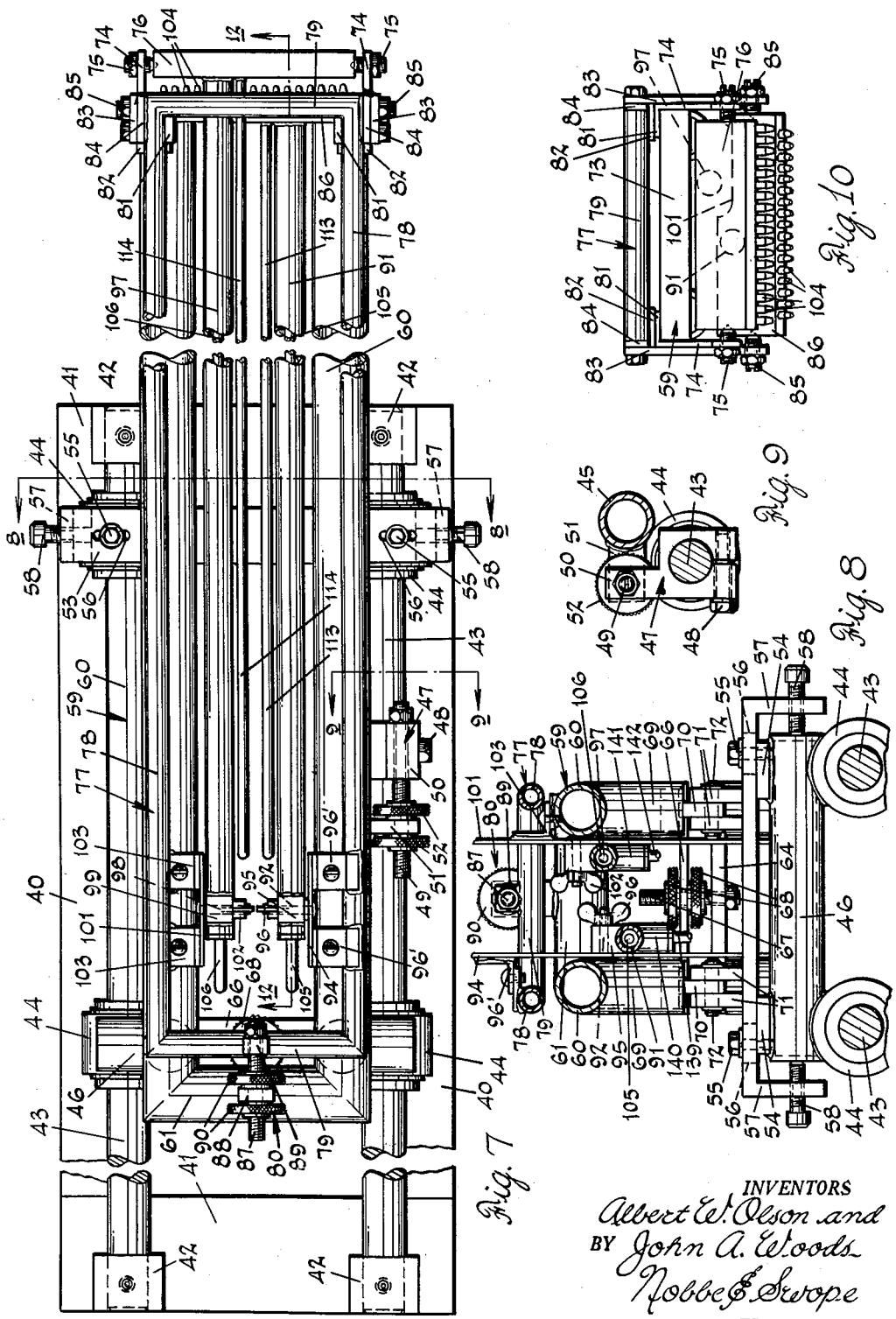

Dec. 13, 1960   A. W. OLSON ET AL   2,964,105
BURNER APPARATUS
Filed March 2, 1953   5 Sheets-Sheet 4
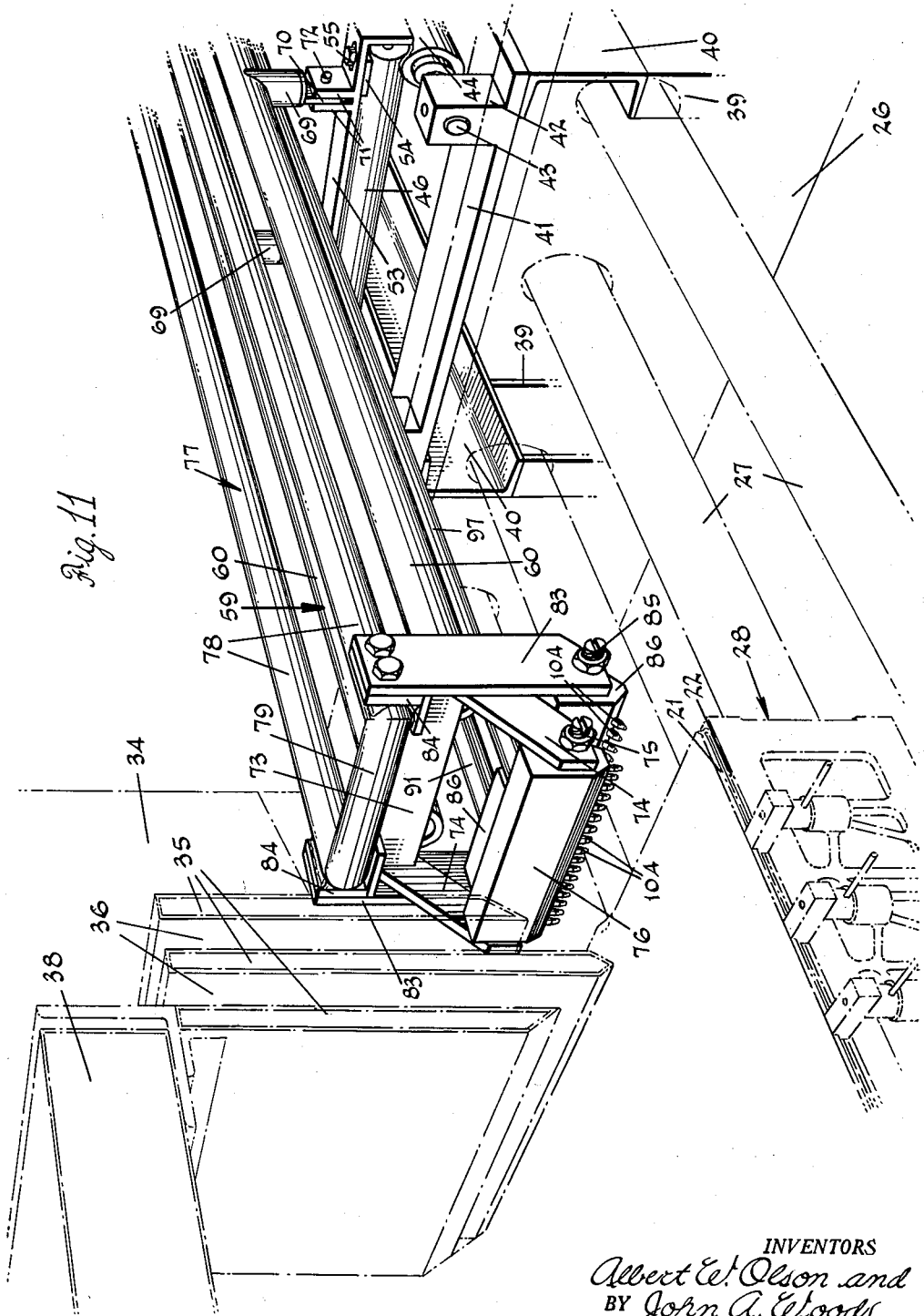
INVENTORS
Albert W. Olson and
BY John A. Woods
Nobbe & Swope
ATTORNEYS Dec. 13, 1960    A. W. OLSON ET AL    2,964,105
BURNER APPARATUS
Filed March 2, 1953    5 Sheets-Sheet 5
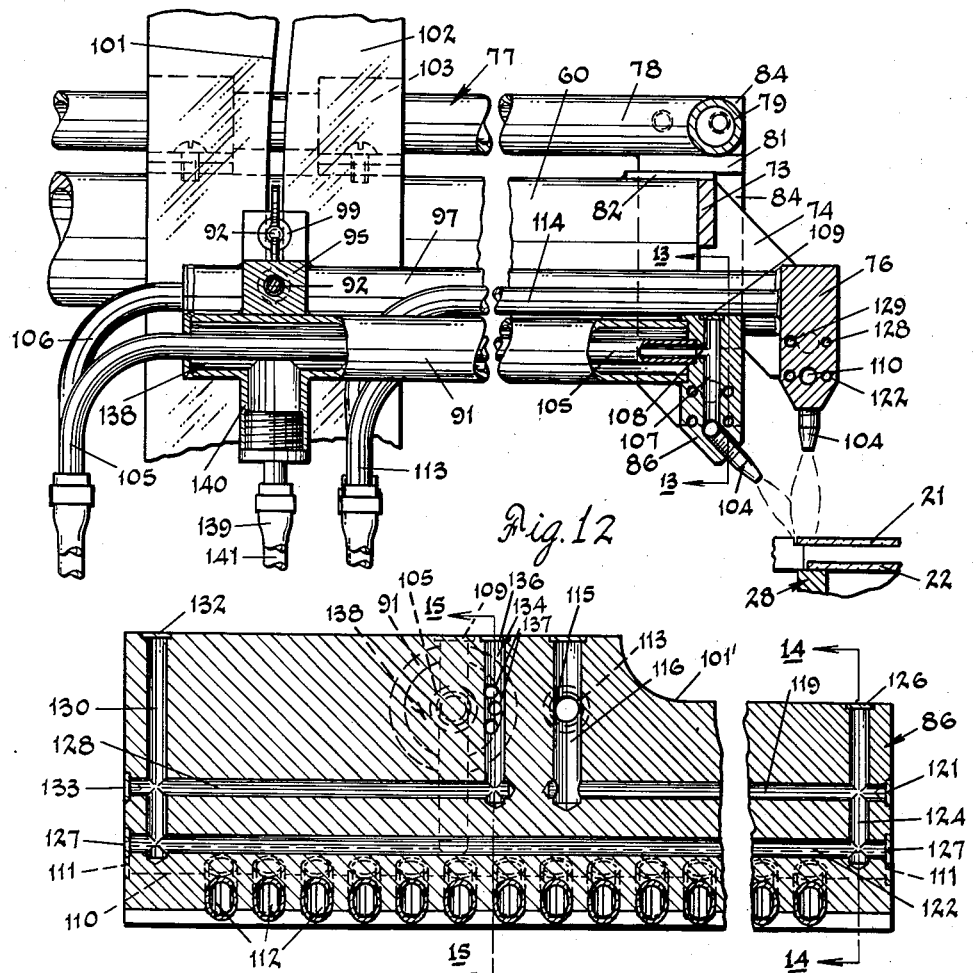
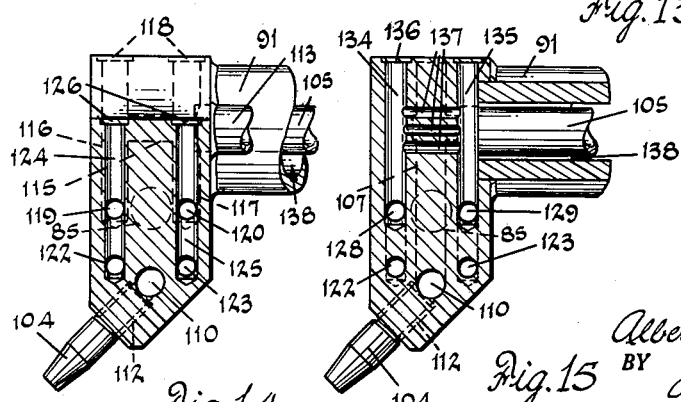
INVENTORS
Albert W. Olson and
BY John A. Woods
Nobbe & Swope
ATTORNEYS

United States Patent Office 2,964,105
Patented Dec. 13, 1960

2,964,105

BURNER APPARATUS

Albert W. Olson and John A. Woods, Toledo, Ohio, assignors to Libbey-Owens-Ford Glass Company, Toledo, Ohio, a corporation of Ohio Filed Mar. 2, 1953, Ser. No. 339,588

3 Claims. (Cl. 158—107)

This invention relates broadly to the production of multiple sheet glazing units. To be more specific, it relates to improved burner apparatus for sealing together the marginal edge portions of spaced sheets of glass to produce hermetically sealed multiple sheet glazing units composed entirely of glass.

Multiple sheet glazing units may be described generally as comprising two or more sheets of glass which are sealed together entirely around their marginal edge portions in spaced relation to provide an hermetically sealed dead air space therebetween. Due principally to their insulating and condensation preventing qualities, such units have become well established fixtures in the building trades and have found wide usage as windows for buildings, show cases, vehicles, refrigerators, and the like.

In the early development of the multiple sheet glazing art, it was customary to seal together the marginal edge portions of the spaced sheets of glass by means of strips of a substantially impervious material which were placed between said portions and bonded thereto in any suitable manner. In many cases, the seal so produced was found not to be hermetic and the unit thus impractical for the purposes of improved insulation and the prevention of condensation. As well, in other instances, the sealing process was found to be so cumbersome and expensive that production on a mass basis was practically impossible.

It has been proposed to form multiple sheet glazing units of the type described entirely of glass by sealing together the marginal edge portions of spaced sheets of glass. According to one method of production, which is described in detail in a copending application, Serial No. 300,884, filed on July 25, 1952, by John A. Woods, Donald E. Sharp, and Alfred E. Badger, and assigned to the assignee of the present application and now abandoned, the spaced sheets of glass are passed through a furnace and between impinging flames from opposed burners to seal first one and then the other pair of opposite marginal edge portions thereof. The opposed burners disclosed in the aforementioned copending application are mounted outwardly of the furnace and are provided with head members which project inwardly of said furnace so as to impinge flames upon and thus fuse together said opposed marginal edge portions of the glass sheets being moved therepast.

It is a principal object of this invention to provide improved burner apparatus of the type described.

It is another object of this invention to provide improved burner apparatus of the type described which may be easily and speedily adjusted to accommodate varying conditions in the production of all-glass, multiple sheet glazing units.

Still another object of this invention is to provide an improved burner of the type described in which the burner heads thereof may be moved relative to one another.

Still another object of this invention is to provide an improved burner of the type described in which the burner heads thereof may each be revolved about an axis parallel to the path of the marginal edge portions to be sealed.

Still another object of this invention is to provide an improved burner of the type described by means of which the burner heads may be precisely moved inwardly and outwardly as well as longitudinally of the path of the glass sheets.

Still another object of this invention is to provide an improved burner of the type described by means of which the direction of the impinging flames therefrom may be moved angularly with respect to one another.

Other objects and advantages of the invention will become more apparent during the course of the following description when taken in connection with the accompanying drawings.

It has been found that in the production runs of all-glass, multiple sheet glazing units according to a method similar to that described in the aforementioned copending application, it is necessary that the flames from the burner heads impinge upon the marginal edge portions of the glass sheets being moved therepast in a predetermined manner so that a permanent seal is applied thereto. That is, the heads of the burners may be advantageously spaced from and angularly disposed with respect to said edge portions in such a manner that each of successive units produced will be hermetically and permanently sealed.

However, different production runs as well as varying sealing conditions make it necessary that the disposition of the burner heads be changed from time to time. Thus, it is of considerable importance that the burner apparatus be provided with burner heads which may be readily adjusted to accommodate the varying conditions aforementioned.

According to this invention, each of the improved burners is mounted on a rigid stand outwardly of a furnace through which the glass sheets to be marginally sealed are passed. Burner heads having concentrated heat sources arranged thereon are provided at the inner ends of the burners and project inwardly of the funrace to permit their proper disposition relative to the path of the glass sheets. The novel burner apparatus of this invention is also provided with means for precisely moving the heads inwardly and outwardly and longitudinally of the path of the glass sheets as well as swinging the heads relative to one another to change the angular disposition of the concentrated heat sources thereof. In addition, said apparatus includes means for swinging both of said heads as a unit about an axis parallel to said path.

In the accompanying drawings, wherein like numerals are employed to designate like parts throughout the same:

Fig. 1 is a perspective view of an all-glass, multiple sheet glazing unit the sides of which have been sealed by the novel burner of this invention;

Fig. 2 is a perspective sectional view of a corner of the unit taken substantially along line 2—2;

Fig. 3 is a partial plan view of an overall apparatus, including the novel burners of this invention, by means of which the unit may be produced;

Fig. 4 is a transverse sectional view of the apparatus of Fig. 3 taken substantially along line 4—4;

Fig. 5 is a side elevation of the novel burner of this invention, showing related apparatus in phantom lines;

Fig. 6 is an end elevation of the burner, viewed from the left of Fig. 5;

Fig. 7 is an enlarged plan view of the burner;

Fig. 8 is a transverse sectional view of the burner taken substantially along broken line 8—8 of Fig. 7;

Fig. 9 is a detail sectional view of the inward and outward adjusting mechanism for the burner and taken substantially along line 9—9 of Fig. 8;

Fig. 10 is a front elevation of the burner heads, viewed from the right of Fig. 7;

Fig. 11 is a partial perspective view of the burner, showing related apparatus in phantom lines;

Fig. 12 is a partial vertical sectional view of the burner taken substantially along line 12—12 of Fig. 7;

Fig. 13 is a longitudinal sectional view of the lower burner head taken substantially along line 13—13 of Fig. 12;

Fig. 14 is a transverse sectional view of the lower burner head taken substantially along line 14—14 of Fig. 13; and Fig. 15 is a transverse sectional view taken substantially along the line 15—15 of Fig. 13.

Referring now particularly to the above-described drawings, there is shown in Fig. 1 an all-glass, multiple sheet glazing unit 20 the marginal edge portions of which have been sealed together entirely therearound by means of the novel burner apparatus of this invention. This unit 20, shown in section in Fig. 2, comprises upper and lower sheets of glass 21 and 22, respectively, a dehydration hole 21' toward a corner of said upper sheet, and side portions 23 which are formed from the fused marginal edge portions of said sheets in a manner substantially as described in the aforementioned copending application and which enclose between said sheets an air space 24.

A part of the overall apparatus for producing the unit is shown in plan and in transverse section in Figs. 3 and 4, respectively. This apparatus includes a frame structure 25, a tunnel-like furnace 26 supported on said frame, conveyor means 27 associated with said frame and disposed within said furnace, and a tray 28 for supporting the unit 20 and adapted to be moved by the conveyor means 27 through the furnace 26.

Disposed along the furnace 26 is a partially open first sealing station 29 which is constructed for the reception in operative relation therewith of the novel burners 30 of this invention. These burners 30 are supported on stands 31 at opposite sides of the sealing station 29 so that the flames from the fusing heads thereof may be impinged simultaneously on the opposite marginal edge portions of the glass sheets being moved therepast over conveyor means 27. It will be understood from the aforementioned copending application, that in producing multiple sheet glazing units generally according to the method therein described, the apparatus would necessarily include additional sealing stations and burners similar to those shown in Fig. 3 for sealing the units entirely therearound.

The particular construction of the furnace apparatus at the sealing station 29 does not form a part of this invention and is shown only in phantom in Figs. 6 and 11 of the drawings. The novel features of this furnace apparatus and its relation to the overall sealing operation is the subject of a copending application, Serial No. 339,229 filed February 27, 1953 by John A. Woods and assigned to the assignee of the present application. With relation to the burners 30, the sealing station 29 is formed in an open or cut-out section of the furnace 26. Within this open section is disposed a baffle or shield construction 32 which is removable from said open section and defines therein opposed V-shaped open sealing areas 33 at both sides of the furnace. The baffle construction 32 includes convergent inner side walls 34 intersecting spaced walls 35 which define flues 36 above the fusing areas. Top walls 37 are disposed over the inner side walls 34 and a separately removable cover plate 38 is supported between the spaced walls 35 and adjacent top walls 37. These walls may be formed of any suitable insulating material common to the furnace art.

As mentioned above, a more detailed description of the sealing station 29 is contained in the application of John A. Woods filed of even date herewith. It is sufficient for the purposes of the present invention to note that the burners 30 are disposed at the opposed V-shaped sealing areas 33 in such a manner that the fusing heads thereof may be positioned in proper sealing relation above the marginal edge portions of the glass sheets to be sealed and below the flues 36, as shown in Figs. 5, 11, and 12.

Referring now particularly to the novel burner apparatus of this invention, the stand 31 comprises upright channel members 39 which support horizontal channels 40 extending lengthwise of the stand. Plates 41 extend transversely between the channels 40 at each end of the stand 31 and carry brackets 42 adjacent the four corners of said stand. Cylindrical rods 43 extend lengthwise of the stand and are supported at opposite ends in the brackets 42.

The burner 30 is adapted to be moved in a defined path inwardly and outwardly of the path of the glass sheets being moved therepast in the furnace 26, or parallel to the length of the stand 31, by means of sleeves 44 slidable over the rods 43 and welded or otherwise secured to a rectangular frame member 44' comprising longitudinal and transverse tubular members 45 and 46, respectively.

Control means are provided for precisely moving the frame member 44' and burner heads supported therefrom, in a manner to be described, relative to the rods 43 of the stand 31. This means comprises a split block 47 which surrounds one of the rods 43 and is securely but removably clamped thereon by a bolt 48. A threaded rod 49 is received and locked at one end to an upstanding portion 50 of the block 47. The opposite free end of the rod 49 is threadedly received by a flange 51 projetcing outwardly from the adjacent longitudinal tubular member 45 of the frame. Lock nuts 52 on the rod 49 at opposite sides of the flange 51 permit the frame 44' to be moved in a very precise manner, as mentioned above. As well, it will be understood that if it is necessary to move the frame 44' beyond the limits of the threaded rod 49, the location of the block 47 on the rod 43 may be adjusted as desired.

A U shaped bar 53 is disposed over the inner or forward transverse tubular member 46 and is slightly spaced therefrom by separator plates 54 welded to the upper surface of said tubular member. The bar 53 is connected to the member 46 by means of bolt and washer assemblies 55 which frictionally engage said bar, pass through slots 56 in said bar, and are anchored to said separator plates. The depending legs 57 of the bar are spaced outwardly of the tubular member 46 and receive threaded bolts 58 which bear against the closed ends of said member, as best shown in Fig. 8. This arrangement permits minute adjustments of the frame member 44' and burner heads supported thereon longitudinally of the path of the glass sheets being moved therepast and transversely of the inward and outward movement of said frame, as described above.

Supported above and connected to the frame member 44' in such a manner as to permit the burner heads to be moved as a unit about an axis parallel to the path of the glass sheets being moved therepast is a substantially U shaped upper frame member 59 comprising longitudinal tubular members 60 connected at their outer or rear end by a transverse tubular member 61. Toward its outer end, the upper frame member 59 is connected to the rear or outer transverse tubular member 46 of frame member 44' by a vertical disposed H shaped connecting member 62 which permits said upper frame member to be lowered or raised as desired.

The lower portion of the connecting member 62 is composed of a pair of posts 63 upstanding from transverse member 46 and supporting between their upper ends a plate 64. The upper portion of said connecting member includes a pair of depending posts 65 in substantial alignment with the posts 63 and secured to opposite longitudinal tubular members 60 of the upper frame member 59. A plate 66 is secured to the lower ends of the posts 65 and is adjustably spaced from and connected to the plate 64 by a threaded rod 67. Lock nuts 68 received on said rod at opposite sides of the plate 66 permit said plate and the upper frame member 59 to be accurately lowered or raised the desired amount.

Inwardly of the H shaped connecting member 62, a pair of posts 69 are secured to and depend from the longitudinal tubular members 60 of the upper frame member 59. Tongues 70 on the lower ends of the posts 69 are pivotally connected to the spaced flanges 71 of the U shaped bar 53 by means of pins 72 which are disposed substantially horizontally and in alignment with one another. Thus, as the outer or rear end of upper frame member 59 is raised or lowered, said frame member and the burner heads supported thereby are caused to swing about a substantially horizontal axis parallel to the path of the marginal edge portions of the glass sheets being sealed.

Secured to and extending between the inner ends of the longitudinal tubular members 60 is a cross plate 73. Angularly disposed and inwardly projecting arms 74 are secured to the opposite ends of the cross plate 73 and each arm receives a pointed rod 75 at its inner end between which upper burner head 76 is pivotally supported. These rods may be tightened to frictionally engage the upper burner head 76 and prevent its tilting or pivotal movement except when positively actuated in a manner to be described hereinafter.

A rectangular frame member 77, composed of longitudinal and transverse tubular rods 78 and 79, respectively, is supported above the upper frame member 59 at its outer end by an adjusting mechanism 80 and at its inner end by plates 81 welded to the underside of the rods 78 and resting on flange portions 82 on the outer ends of the arms 74. The frictionally engaging faces of the plates 81 and flange portions 82 (as best shown in Fig. 12) are finished to permit frame member 77 to be moved longitudinally of upper frame member 59. Flange portions 82 of the arms 74 may be welded to the tubular members 60 in securing said arms relative to cross plate 73 and the upper frame member 59.

Arms 83 are bolted to upright plates 84 which are welded to tubular rods 78 and plates 81 adjacent the inner transverse tubular rod 79. Each of the arms 83 depends vertically below the arms 74 and receives a pointed rod 85 at its lower end between which lower burner head 86 is pivotally and frictionally supported, similarly to upper burner head 76. Thus, it will be understood that as frame member 77 is moved longitudinally of upper frame member 59 and plates 81 are caused to slide over flange portions 82, the lower burner head 86 is moved inwardly of or transversely to the path of the glass sheets being moved therepast and relative to the upper burner head 76 which maintains its stationary position.

The aforementioned adjusting mechanism 80 at the outer end of the frame member 77 provides means by which said frame member may be accurately moved in the manner abovedescribed. This mechanism comprises a threaded rod 87 which is received in brackets 88 and 89 upstanding from transverse tubular frame member 61 and transverse tubular rod 79, respectively. The end of the rod 87 received in the bracket 89 is locked thereto and lock nuts 90 are disposed on said rod at opposite sides of the bracket 88 to permit accurate movement or adjustment of frame member 77.

Means are also provided for individually swinging the upper and lower burner heads 76 and 86 angularly with respect to one another about an axis parallel to the path of the glass sheets being moved therepast. For the lower burner head 86, this means comprises a tubular member 91 received at its inner end in said lower burner head and supported at its outer end by a headed rod 92 received in a contoured slot 93 in a guideway 94. The rod 92 is carried by a stud 95 on the tubular member 91 and may be releasably locked in place in the guideway 94 by a wing nut 96. The guideway is held upright and secured to the longitudinal tubular rod of frame member 77 by means of bracket 96'.

The contour of the slot 93 in the guideway 94 conforms to an arc having its axis at the pivotal rod supports 85 and a radius corresponding to the distance between said supports and the headed rod 92. Thus, it will be understood that by manipulation of the headed rod 92 in the slot 93, the lower burner head 86 may be swung on its pivotal connection with the arms 83 so as to dispose the nozzles projecting therefrom at the desired angle about an axis parallel to the path aforementioned.

A similar means is provided for the upper burner head 76 and comprises a tubular member 97 extending parallel to member 91 and received at its inner end in said upper burner head and at its outer end by a headed rod 98 carried by a stud 99 on the tubular member 97 and received in a contoured slot 100 in a guideway 101. It will be noted in this respect that a corner of lower burner head 86 is cut away at 101' to permit free passage of tubular member 97 therepast. As in the case of rod 92 supporting the outer end of tubular member 91, the rod 98 may be releasably locked in place in the slot 100 of guideway 101 by a wing nut 102.

However, the guideway 101 is held upright and secured by means of bracket 103 to the longitudinal tubular frame member 60 of the upper frame member 59. Also, the contour of the slot 100 in the guideway 101 conforms to an arc having its axis at the pivotal supports 75 and a radius corresponding to the distance between said supports and the headed rod 98. In this manner, of course, the nozzles of the upper burner head 76 may be angularly disposed as desired similarly to the lower burner head 86.

Referring now specifically to the construction of the burner heads 76 and 86, each comprises a substantially rectangular manifold of suitable heat resistant material and having a row of aligned nozzles 104 threadedly received in a lower wall thereof and projecting outwardly therefrom along a path substantially parallel to that of the glass sheets being moved therepast. As best shown in Fig. 12 and as more fully described in the aforementioned copending application, Serial No. 300,884, the burner heads and nozzles are generally arranged so as to impinge on the marginal edge portions of the glass sheets 21 and 22 being moved therepast on the tray 28. More specifically, the nozzles of the lower burner head 86 are generally directed toward the marginal edge portion of the lower sheet 22 at an angle of about 45° and those of the upper burner head 76 perpendicularly downward toward the marginal edge portion of the upper sheet 21. Of course, optimum operating conditions are to a great extent determined experimentally. The novel burner apparatus of this invention permits the burner head nozzles to be readily and accurately positioned in the desired location relative to the path of the glass sheets 21 and 22.

Fuel gas and cooling fluid are fed from suitable sources (not shown) to each of the burner heads 76 and 86. Passages are provided within the manifolds of each of the burner heads whereby the fuel gas may be distributed to the burner head nozzles 104 and the cooling fluid circulated therethrough in the conventional manner. Fuel inlet pipes 105 and 106 enter through the closed outer ends of tubular members 91 and 97, respectively, and are extended centrally thereof and in spaced relation thereto to sockets in the lower and upper burner heads 86 and 76, respectively.

The arrangement of the passages within the lower burner head 86 are illustrated by the sectional views of Figs. 13 to 15 and it will be understood that those within the upper burner head 76 are arranged in a substantially similar manner. With particular reference to the fuel gas passages, it can be seen from Fig. 12 that fuel gas from inlet pipe 105 is directed to a vertical passage 107 by means of a short horizontal passage 108 which serves as an extension of said inlet pipe. The vertical passage 107 is closed at its upper end by a plug 109 and connects at its lower end with a horizontally disposed distributor passage 110 which is closed at its opposite ends by plugs 111. Threaded sockets 112 project downwardly from said distributor passage in equally spaced and aligned relation for receiving the nozzles 104.

A coolant from any suitable source (not shown) may be introduced into each of the lower and upper burner heads 86 and 76 through coolant inlet pipes 113 and 114, respectively, which are secured to the rear walls of the respective burner heads. As shown in Figs. 13 and 14, a horizontal passage 115 serves as a continuation of coolant inlet pipe 113 and connects vertical parallel passages 116 and 117 extending downwardly from the top of the manifold and closed at their upper ends by plugs 118. Horizontally disposed upper passages 119 and 120 extend in parallel relation from vertical passages 116 and 117, respectively, to a side wall of the manifold where they are closed by plugs 121. These upper passages 119 and 120 are connected to horizontally disposed and parallel lower passages 122 and 123, respectively, by vertical connecting passages 124 and 125 which extend downwardly from the top wall of the manifold and are closed by plugs 126.

The lower passages 122 and 123 extend along the opposite sides of the fuel gas distributor passage 110 to effectively cool the same adjacent nozzles 104 and are closed at opposite ends by plugs 127. These lower passages 122 and 123 are connected to upper horizontal passages 128 and 129, respectively, by means of vertical passages 130 and 131 which extend downwardly from the top of the manifold and are closed by plugs 132.

The upper horizontal passages 128 and 129 are extended from a side wall of the manifold in substantial alignment with the upper passages 119 and 120. The outer ends of passages 128 and 129 are closed by plugs 133 and the inner ends thereof connect, respectively, with vertical passages 134 and 135 which extend downwardly from the top of the manifold and are closed by plugs 136. Connection is provided between vertical passages 134 and 135 by means of three transversely extending passages 137 which are disposed so as to intersect with the passage 135 adjacent its outlet to a coolant outlet conduit 138 in the annular space formed between fuel gas inlet pipe 105 and tubular member 91 (see Fig. 15).

A coolant outlet pipe 139 is connected to a nipple 140 on the outer end of the tubular member 91, as best shown in Fig. 12, to permit the coolant to be carried to a suitable disposal point (not shown). Similar connections, such as nipple 141 and coolant outlet pipe 142 (Fig. 8) are provided for the tubular member 97 and the upper burner head 76, such that coolant may be circulated through both of the burner heads during the sealing or fusing operations.

It is to be understood that the form of the invention disclosed herein is to be taken as the preferred embodiment thereof, and that various changes in the shape, size and arrangement of parts may be resorted to without departing from the spirit of the invention or the scope of the following claims.

We claim:

1. Burner apparatus comprising a stand, a lower frame on said stand and movable longitudinally with respect thereto, an upper frame above and pivotally connected to said lower frame about a substantially horizontal axis, means for swinging said upper frame about said axis, burner heads carried by said upper frame, means for directing a flame away from said burner heads arranged on each of said burner heads so as to define a substantially straight line parallel to said horizontal axis, means for individually pivotally moving each of said burner heads independently of said upper frame about an axis substantially parallel to said straight line, and means for moving one of said burner heads independently of said upper frame in a defined path substantially perpendicular to said straight line.

2. Burner apparatus comprising a stand, a lower frame member guidably movable longitudinally on said stand, an upper frame member extending longitudinally of said lower frame member with an inner end disposed thereover and the opposite outer end projecting outwardly therefrom, means pivotally connecting an intermediate portion of said upper frame member to said lower frame member about a substantially transverse horizontal axis, means for swinging said upper frame member about said axis, burner heads separately carried at the outer end of said upper frame member, means for directing a flame away from said burner head mount on each of said burner heads and arranged so as to define a line substantially parallel to said axis, and means for individually swinging each of said burner heads relative to said upper frame member about an axis parallel to said line.

3. Burner apparatus of the character defined in claim 2, having means for moving one of said burner heads in a defined horizontal path longitudinally of said upper frame member.

References Cited in the file of this patent

UNITED STATES PATENTS

| | | |
|---|---|---|
| 2,125,177 | Jones | July 26, 1938 |
| 2,125,179 | Doyles | July 26, 1938 |
| 2,186,096 | Bucknam | Jan. 9, 1940 |
| 2,264,697 | Jacobson | Dec. 2, 1941 |
| 2,336,544 | Hopfield | Dec. 14, 1943 |
| 2,602,496 | Heller et al. | July 8, 1952 |
| 2,671,987 | Jendrisak | Mar. 16, 1954 |